United States Patent [19]
Mizia et al.

[11] Patent Number: 5,271,878
[45] Date of Patent: Dec. 21, 1993

[54] INSULATING HALF-LOG PANEL

[75] Inventors: Charles A. Mizia; Richard S. Mizia, both of Duluth, Minn.

[73] Assignee: Husky Panel Systems, Inc., Duluth, Minn.

[21] Appl. No.: 950,710

[22] Filed: Sep. 25, 1992

[51] Int. Cl.$^5$ .................. B29D 9/02; B32B 3/10
[52] U.S. Cl. ................. 264/45.5; 52/233; 52/309.4; 52/309.11; 52/309.14; 52/405; 144/329; 264/138
[58] Field of Search .......... 264/45.5, 46.1, 46.4, 264/138; 428/17; 52/233, 404, 405, 309.4, 309.5, 309.9, 309.11, 309.13, 309.14, 309.15; 144/329

[56] References Cited

U.S. PATENT DOCUMENTS

| | | | |
|---|---|---|---|
| 1,655,701 | 1/1928 | Hyland et al. | 52/233 |
| 1,953,460 | 4/1934 | Bernhard | 52/233 |
| 1,971,994 | 8/1934 | Smith | 72/36 |
| 2,130,231 | 9/1938 | Forciea | 52/233 |
| 2,289,018 | 7/1942 | Jonsrud | 52/233 |
| 2,619,686 | 12/1952 | Dombrowski | 52/233 |
| 2,787,029 | 4/1957 | Johnson | 52/233 |
| 2,829,404 | 4/1958 | Wilson | 52/233 |
| 2,870,793 | 1/1959 | Bailey | 138/78 |
| 3,013,584 | 12/1961 | Reed et al. | 138/145 |
| 3,129,983 | 4/1964 | May et al. | 308/36.1 |
| 3,377,758 | 4/1968 | Witschnig | 52/233 |
| 3,970,401 | 7/1976 | Lubeck | 403/265 |
| 3,992,838 | 11/1976 | Vizziello | 52/233 |
| 4,141,954 | 2/1979 | Anstadt et al. | 264/45.5 |
| 4,232,067 | 11/1980 | Coleman | 428/17 |
| 4,305,238 | 12/1981 | Harward et al. | 52/233 |

Primary Examiner—W. Donald Bray
Attorney, Agent, or Firm—Richard E. Brink

[57] ABSTRACT

A simulated half log having a generally semi-cylindrical foam core and a decorative layer on the curved surface. Complementary nailable splines are inset in the flat surface, permitting adjacent half logs to interlock. One spline, which extends beyond the edge, provides a surface for nailing to a vertical substrate, and is concealed when the next adjacent half log is mounted thereover.

8 Claims, 1 Drawing Sheet

INSULATING HALF-LOG PANEL

BACKGROUND OF THE INVENTION

The rustic appearance of log houses has long held a nostalgic appeal for many persons in this country. Log homes, however, have a number of disadvantages, not the least of which is the ecologically undesirably necessity of cutting down a large number of trees to obtain the legs. The horizontal positioning of logs on top of each other and holding them in position has been difficult. Additionally, Insulating a log home poses special problems.

One attempted solution to these problems, illustrated in U.S. Pat. No. 4,305,238, has been to form semi-cylindrical hollow logs having a flat face and a curved outer skin of simulated wood grain and fill the interior with insulating material, e.g., foamed resin, wood chips or sawdust-glue, almost inevitably creating air pockets not reached by the filling material. The flat faces of such half logs are then splined together and glued or fastened (by some undisclosed means) to vertical supports. Alternatively, the flat faces can be attached to each other to form a structure resembling a full log; such logs can then be stacked horizontally and apparently maintained in position by gravity. While solving some of the problems involved in the building of log homes, simulated logs of the type just described are inconvenient to manufacture, and attaching them to vertical supports is difficult.

BRIEF SUMMARY

Like the insulation-filled simulated logs of the prior art described in the preceding section, the present invention provides synthetic half logs that closely resemble natural wood but are light in weight and provide excellent insulation. These half logs are easy to manufacture, are readily attached to a vertical support by a concealed means, and are mounted to provide a drip edge that prevents or inhibits penetration of moisture between adjacent logs.

The present invention provides a simulated half log comprising in combination a preformed, generally semi-cylindrical rigid foamed core having a cross-section approximating the arc and subtending chord of a circle. This structure thus has a flat side surface, a curved side surface, and two ends. Adjacent each lateral edge, flush with the flat surface and extending along the entire length of the log, is a rigid, spline formed of nail-receptive material. The two splines are complementarily shaped, so that the splines of each half log are capable of interlocking with the splines of the immediately adjacent half log. Each log can be mounted by nailing one of the splines to a support. The resultant product, then, is a standard product similar to conventional siding, requiring no special techniques for handling, and readily utilized by ordinary carpenters.

BRIEF DESCRIPTION OF THE DRAWING

Understanding of the invention will be facilitated by referring to the accompanying drawing, in which like numbers refer to like parts in the several view, and in which.

DETAILED DESCRIPTION

Figure 1:
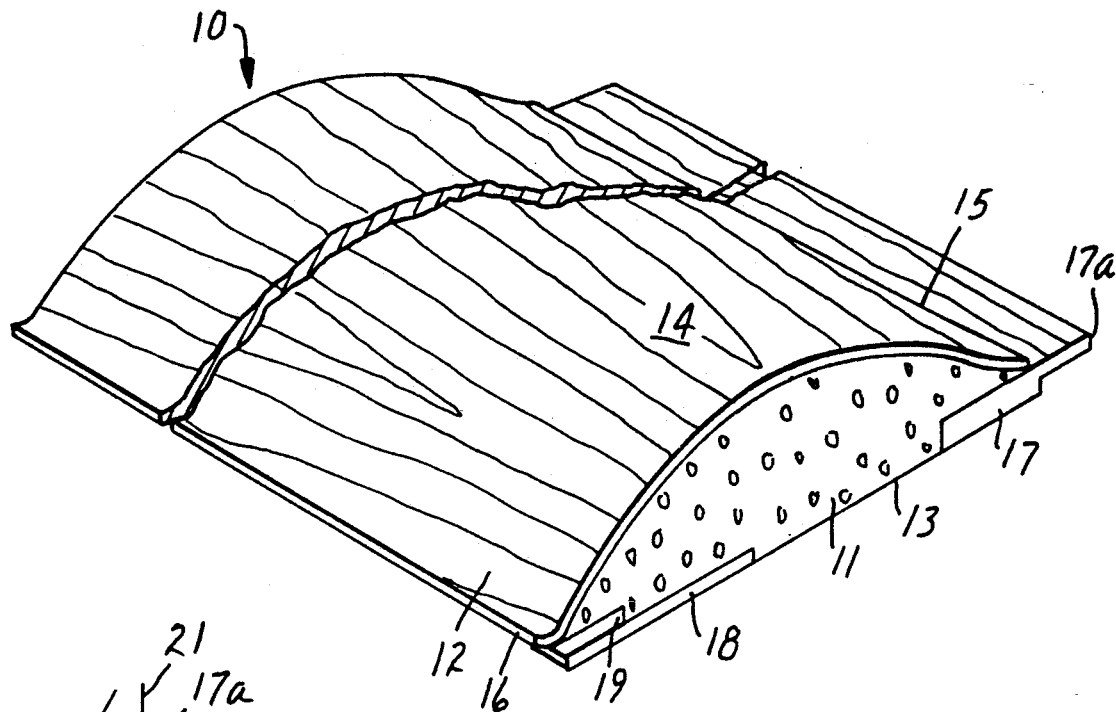
FIG. 1 is a perspective view of a half log made in accordance with the invention.

In the drawing, half log 10 comprises rigid, preformed foamed polystyrene core 11 surfaced with hardboard veneer 12, the resultant structure having flat face 13 and curved face 14, the two surfaces meeting at edges 15 and 16. If edges 15 and 16 were extended to the same plane as flat face 13, the cross-sectional distance between the two would constitute the chord of a circle. Inset into flat face 13 adjacent edge 15 is nail-receptive spline 17, preferably made from oriented strandboard. Spline 17 terminates in tongue 17a, which is thinner than the remainder of spline 17. Similarly inset into flat face 13, adjacent edge 16, is spline 18, also preferably formed of oriented strandboard. The portion of core 11 immediately adjacent edge 16 is undercut, and spline 18 extends partly beyond the edge of the undercut portion, providing groove 19.

Figure 2:
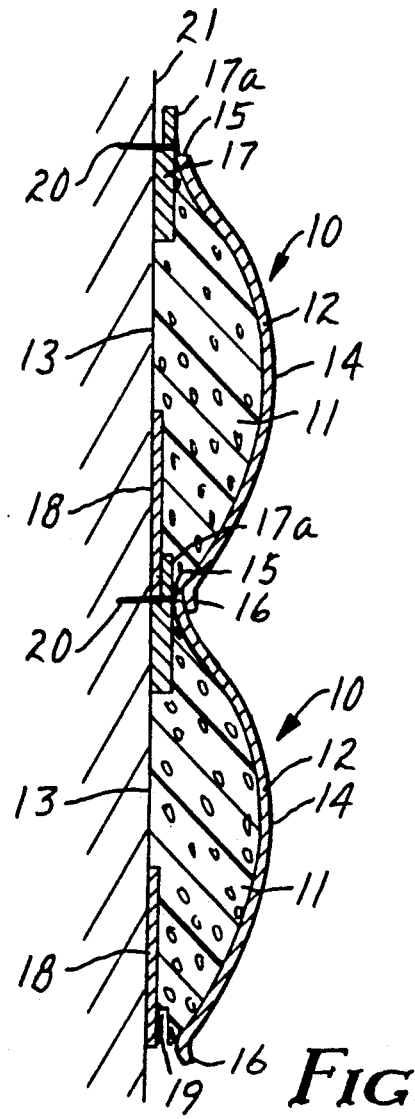
FIG. 2 is a cross-sectional side view of a plurality of the logs of FIG. 1 mounted adjacent to each other on a vertical support.

As can best be seen in FIG. 2, tongue 17a and groove 19 are complementary, so that the tongue of one half log fits into the groove of the adjacent half log, locking them together. Similarly, to ensure a snug fit for adjacent logs, the portion of the upper surface adjacent edge 15 is provided with a concave curve, corresponding to the convex curve on the lower surface of core 11 adjacent edge 16. Nail 20 extends through spline 17, attaching it to vertical support 21. When groove 19 of the adjacent half log is fitted over spline 17, nail 20 is no longer visible. The ability to provide a concealed nailing strip is considered a distinct advantage of the present invention. Thus, the half logs of the invention can be nailed directly to studs, not requiring a flat mounting surface or attachment with adhesive, both of which are required by the structure shown in aforementioned U.S. Pat. No. 4,305,238.

In preparing half logs of the invention, a standard size (96 inches long ×48 inches wide ×30 inches high) expanded polystyrene billet is processed to yield eighteen of the semi-cylindroid cores 11, each having a 13-inch diameter (or, more technically correctly, chord), using a computer-driven hot wire cutter. Two of these cores are then laid end to end. A sixteen-foot strip of 7/16"×3-15/16" oriented strandboard, shaped to form spline 17 is then laminated in place using a moisture-curable 100% solids (i.e., solvent-free) polyurethane. In carrying out this process, the strandboard strip is first coated with adhesive, a water mist then sprayed on the surface to ensure a uniform cure rate, and the spline than positioned at the proper location on foamed core 11. A ½"×2-15/16" oriented strandboard strip, corresponding to spline 18 is then similarly adhered in place at the appropriate location on foamed core 11. A ½" thick sheet of heat-treated hardboard veneer, having one side embossed with a rough-sawn cedar pattern and preferably treated with a fire retardant chemical, is then coated with the moisture-curing polyurethane adhesive, exposed to a water mist, and positioned over the curved surface of core 11. The layup is then positioned on a vacuum table diaphragm press, where it is aligned and then pressed. As a vacuum is applied, a rubber diaphragm, which conforms to the shape of the half log, forces the veneer to conform to the profile of core 11. Radiant heat is applied to the diaphragm to accelerate cure of the adhesive.

The thus-formed half logs are then fed through two in-line industrial shapers, the first one of which cuts locking channel 19 and the second of which cuts away a portion of spline 17 to leave tongue 17a. A thermal barrier paint is then rolled onto the ends of the logs to protect the core from heat deformation during the subsequent staining step. The half logs are fed into a surface preheater, which warms the hardboard to approximately 300° F., causing the pores of the hardboard to open. A robotic arm bearing spray nozzles then applies the stain or paint, after which the sprayed half logs pass under a series of heating elements to fully cure the stain or paint. The staining and curing step is then repeated. A finished log having a chord width of 13.5 inches weighs about 28 lbs., only about ⅓ the weight of an equivalent-sized kiln-dried softwood log.

The invention eliminates two labor-intensive field applications, viz., installing an insulation board and painting the siding. The rigidity of the present half log, its insulative properties, and its ability to be nailed directly to studs permits the direct installation of an insulated prefinished siding. The locking spline system enables the use of only one line of hidden fasteners for each siding course. As is particularly shown in FIG. 2, each horizontal siding interface is protected by a drip edge that covers the fasteners and wicks moisture away from the seam, thereby inhibiting or preventing product degradation.

It will be apparent that numerous changes to the structure just described can be made without departing from the spirit of the invention. Without in any way attempting to deal exhaustively with such alternatives, it should be noted that the oriented strand hardboard, which is both strong and inexpensive, could be replaced with particle board, plywood, or solid lumber. The hardboard veneer could be replaced with "Formica" laminate, metal sheeting, or any other suitable material. To increase strength, it may be desirable to adhere a sheet of smooth hardboard between the exterior veneer and core 11. Similarly, the exact dimensions are not critical, but can be modified to suit the end use.

What is claimed is as follows:

1. A simulated half log comprising in combination:
   a preformed generally semi-cylindrical rigid foamed core having a cross-section approximating the arc and subtending chord of a circle, said core having a flat side surface, a curved side surface, and two ends, the curved side and the flat side meeting at lateral edges,
   adjacent each lateral edge, flush with the flat surface and inset thereinto, a rigid, nailable spline, the two splines being complementarily shaped so that the splines of one half log are capable of interlocking with the splines of adjacent simulated half logs.

2. The half log of claim 1 wherein the splines are made of oriented strandboard.

3. The half log of claim 1 wherein one lateral edge is foreshortened and a portion of the core removed, so that the spline of an adjacent half log extends under said one edge and is concealed when interlocked.

4. The half log of claim 3 wherein the spline adjacent the other lateral edge extends beyond said edge, thereby providing a nailing surface that is concealed when the adjacent half log is mounted thereover, said nailing surface affording a means for mounting the log on a vertical surface.

5. The half log of claim 4 wherein a decorative skin is bonded to the curved surface.

6. The half log of claim 5 wherein the decorative skin is heat-treated hardboard.

7. A method of making the half log of claim 1 comprising machining a semi-cylindroid from a foamed polystyrene billet, said semi-cylindroid having a flat face and a curved face, machining a groove along the flat face of the billet adjacent each edge where it intersects the curved face, laminating an oriented strandboard strip in each such groove, said strandboard strips being contoured to be complementary, and laminating a sheet of heat-treated hardboard veneer to the curved face.

8. The method of claim 7 including the additional step of painting or staining the hardboard veneer.

* * * * *